US 6,544,452 B1

(12) United States Patent
Stevens

(10) Patent No.: US 6,544,452 B1
(45) Date of Patent: Apr. 8, 2003

(54) POLYMER PROCESSING METHOD AND TABLET-FORMING APPARATUS

(75) Inventor: Henry Guy Stevens, Colby (GB)

(73) Assignee: PVAXX Technologies Ltd., London (GB)

( * ) Notice: Subject to any disclaimer, the term of this patent is extended or adjusted under 35 U.S.C. 154(b) by 0 days.

(21) Appl. No.: 09/336,205

(22) Filed: Jun. 18, 1999

(51) Int. Cl.$^7$ ............................................. B29C 43/46
(52) U.S. Cl. ..................... 264/109; 264/115; 264/124; 264/320
(58) Field of Search ................. 264/109, 123, 264/124, 115, 141, 142, 234, 319, 320

(56) References Cited

U.S. PATENT DOCUMENTS

| | | |
|---|---|---|
| 3,233,022 A | 2/1966 | Henry et al. |
| 3,791,802 A | 2/1974 | Holowaty |
| 4,194,901 A | 3/1980 | Gambacorta |
| 4,248,819 A * | 2/1981 | Mayer et al. ............... 264/109 |
| 4,298,858 A | 11/1981 | Romanski |
| 4,362,559 A | 12/1982 | Perez et al. |
| 4,389,506 A * | 6/1983 | Hassall, Jr. ................. 524/377 |
| 4,409,171 A | 10/1983 | Leon et al. |
| 4,424,016 A | 1/1984 | Matsuda et al. |
| 4,436,682 A * | 3/1984 | Knopp ........................ 264/70 |
| 4,469,837 A * | 9/1984 | Cattaneo ..................... 524/388 |
| 4,775,715 A * | 10/1988 | Beresniewicz et al. ....... 525/61 |
| 4,849,256 A * | 7/1989 | Newman et al. ............ 427/202 |
| 5,176,751 A | 1/1993 | Findley |
| 5,373,054 A * | 12/1994 | Sanuli et al. ................. 525/57 |
| 5,395,880 A * | 3/1995 | Sato et al. .................... 525/59 |
| 5,811,488 A * | 9/1998 | Narumoto et al. ............ 525/56 |
| 5,814,266 A * | 9/1998 | Pienkowski et al. ........ 264/443 |
| 5,922,808 A * | 7/1999 | Hanada et al. ................ 525/58 |
| 6,054,519 A * | 4/2000 | Jakob et al. ................ 524/354 |

FOREIGN PATENT DOCUMENTS

| | | |
|---|---|---|
| CA | 890833 | 1/1972 |
| EP | 0169382 | 1/1986 |
| EP | 4081440 | 3/1992 |
| FR | 2714326 | 6/1995 |
| GB | 1397127 | 6/1975 |
| GB | 1272617 | 5/1992 |
| WO | 8504365 | 10/1985 |
| WO | 9201556 | 2/1992 |
| WO | 9220329 | 11/1992 |
| WO | 9736722 | 10/1997 |

OTHER PUBLICATIONS

Concise Encyclopedia of Polymer Science and Engineering, Kroschwitz, J., ed., John Wiley & Sons, 1990, pp. 1233–1234.*

* cited by examiner

Primary Examiner—Mark Eashoo
(74) Attorney, Agent, or Firm—Hodgson Russ LLP

(57) ABSTRACT

The invention provides a compounded polymer feedstock formed by cold-pressing of the ingredients into tablets or pellets. This avoids the need for heating associated with conventional pellet-forming processes, and is particularly suitable for compounding of heat-sensitive materials such as PVA. The invention also provides a novel tablet-forming apparatus, suitable for forming large volumes of pressed compounded polymer feedstock, together with tablets of the feedstock, and methods of manufacturing plastics products using the tablets.

13 Claims, 1 Drawing Sheet

POLYMER PROCESSING METHOD AND TABLET-FORMING APPARATUS

The present invention relates generally to the manufacture of plastics materials, particularly, but not exclusively, from polymers which require compounding before manufacture, and/or polymers which are sensitive to heat treatment.

Many polymers are produced from a polymerisation reactor as a relatively coarse powder or granules. Before extrusion or moulding into a final plastics material product, the polymer usually needs to be compounded with other ingredients, for example lubricants, stabilizers, plasticizers, filler, foaming agents, colouring agents, flame retardant agents, flow improvers and the like.

It is possible to mix the ingredients together as powders immediately prior to extrusion or moulding the final product, or to add ingredients to the material as it is being extruded. However, it is often very difficult to achieve reliable dispersion of all additives throughout the powder to achieve a uniform product. In addition, the powdered material is not easy to work with, and can tend to form bridges and clog up machinery. The powdered material can also give rise to dust, so operators are required to wear masks and other protective clothing to handle the material. Thus, it is preferred to avoid the use of powdered material is possible.

An alternative method is to mix the desired ingredients and then melt them and extrude the mixture to form pellets. The pellets can be fed more reliably into an extruder by the end user, and require less specialised handling precautions. In addition, the ingredients may be more evenly mixed in the pellets. This method has been used successfully or some thermoplastics such as polyethylene.

A problem with this method is that a significant amount of energy is required to form the pellets, leading to an increased cost of the final product.

GB-1,397,127 discloses a method of producing pellets in which a thermoplastic polymer of an $\alpha$-olefin having a specified particle distribution and a melt index of less than 100 and glass fibres are mixed in a dry blender and cold compacted into pellets; this is disclosed to avoid problems stated to be associated with having water present in the formed pellets.

Another problem is that many compositions are not completely heat-stable, but are sensitive to the thermal history of the composition. Particularly problems arise with such polymers are PVA (polyvinyl alcohol) and PVC (polyvinyl chloride), but the problems may be present in a variety of plastics materials, depending on the nature of both the polymer and of the compounding ingredients. The result of this heat-sensitivity is that the product is affected by variations in both the initial pellet-forming process and the extrusion process.

Whilst satisfactory extrusion can normally be achieved by adjusting the final extrusion parameters, and also by controlling the pellet forming process (for example by melting the pellets at a relatively low temperature and rapidly cooling the pellets to minimise heat degradation), a significant proportion of the product may be wasted as the extrusion parameters are optimised. The problem is more acute for products which are particularly heat-sensitive, such as bio-degradable products or adhesives based on PVA, in which typically the first twenty minutes or so of production may be wasted every time the machine is started, and in which cleaning operations may be required when the machine is stopped. For a machine capable of extruding many tonnes every hour, this represents significant wastage.

As a result of the problems obtaining reliable extrusion, although the basic ingredients for PVA-based biodegradable plastics are comparatively cheap, the final cost of the product is at present significantly higher than polyethylene based products partly because of the above production problems; bio-degradable plastics might be more widely used if these problems could be alleviated.

The invention is generally, but not exclusively, concerned with providing a polymer feedstock which alleviates some or all of the above problems. By polymer feedstock is meant a substance containing polymer in a form suitable for feeding to a machine, preferably a conventional extrusion apparatus, for manufacturing a product of plastics material, preferably a thermoplastic material. References to compounding imply that the raw polymer is blended with additives to give desired properties in the finished product, or to affect the processing of the product.

According to a first aspect, the invention provides a method of producing a compounded polymer feedstock comprising mixing a polymer, preferably substantially uncompounded and in powder or granular form, with at least one compounding ingredient and cold pressing the mixture to form a tablet or pellet. The mixture preferably contains moisture serving to bind the tablets or pellets.

With this method, the ingredients can be uniformly mixed and compounded in the correct proportions for the final product, and made into a form that is easier to handle than powder. In addition, since the mixture is cold pressed rather than melted, problems of thermal degradation or variation in properties are reduced. The method need not rely on $\alpha$-olefin polymers of particular properties to ensure binding, but is most preferably employed in conjunction with polymers such as PVA which can be readily bound under pressure in the presence of small quantities of moisture.

References to "cold pressinng" are intended to imply applying pressure to the powder to cause agglomeration without substantially melting of the polymer. The temperature is preferably less than about 100 degrees celsius, more preferably less than about 70–80 degrees celsius. Preferably heat is not applied directly to the mixture. However, heat may be generated by mixing and/or pressing, and this may be allowed to warm the mixture, or cooling may be provided. It is permissible for some heat to be applied directly if necessary to facilitate binding. Some melting of the polymer or other ingredients may occur, particularly on a microscopic scale as a result of pressure at the interface between adjacent particles, but it is important that the bulk of the polymer granules do not liquify.

Preferably, the mixture is compressed in discrete quantities into tablets or pellets, for example in a table press; this may provide more reliable agglomeration.

However, it is possible for the mixture to be extruded under pressure through an orifice, the pellets forming following exit of the mixture from the orifice. In such a case, binder or moisture may be added to the mixture, preferably as the mixture is extruded, or after preliminary mixing of the constituents.

Preferably, the mixture is substantially dry, but includes sufficient residual moisture to bind the tablets or pellets on pressing. This avoids the need to add a separate binder, and allows the tablets or pellets to be broken more easily as they enter the extruder simply by drying them further. When water is relied upon for binding, it is desirable (although not absolutely essential) to ensure that the tablets or pellets are dried prior to extruding, for example at between 40 and 80 degrees celsius for 4–8 hours; this alleviates problems of vapour formation during extrusion. The moisture content is desirable to form the tablets, but after forming, the tablets should in most cases retain their shape even when dried.

Preferably, the moisture content is less than about 10% by weight, and preferably greater than 0.1% by weight, more preferably at least about 1% and preferably no more than about 5%. If the pellets or tablets are extruded or otherwise formed at relatively low pressures, however, the moisture content may be about 20% or even higher to ensure binding. If the pellets are too moist, they may tend to stick together, inhibiting flow, and drying after forming may be desirable.

The moisture may comprise residual moisture in the polymer or in one more of the compounding ingredients. In this way, moisture can be provided automatically simply by not drying the ingredients fully prior to mixing.

The at least one compounding ingredient preferably includes a lubricant, slip agent or flow improver. Preferably the mixed ingredients are supplied to pressing means for forming the tablets or pellets in the form of a free-flowing powder. This may facilitate processing of the powder, for example by allowing the powder to be fed under the action of gravity.

The at least one compounding ingredient may include at least one of the following as optional ingredients: a stabiliser, a filler, a colouring agent, a plasticiser, a foaming agent, a flame-retardant agent.

Although the precise nature of the compounding ingredient may vary from application to application, the mixture desirably includes at least two compounding ingredients, preferably a lubricant or flow improver or slip agent and at least one of a stabiliser, a plasticiser and a filler. Pre-forming such compositions as tablets or pellets may facilitate a subsequent extrusion process. It will be appreciated that certain of the other ingredients in the mixture may serve to enhance binding; the presence of other binding agents is not excluded, the invention residing primarily in the use of moisture to contribute to binding.

The polymer and all compounding ingredients are preferably food-grade and/or bio-degradeable. This allows the resulting pellets to be more widely used as polymer feedstock. The method may however include adding an ingredient which is not bio-degradeable and/or is non-food-grade to the tablet or pellet prior to forming.

The method may further include the step of melting the tablets or pellets and extruding or moulding the mixture to form a product. Optionally, other ingredients may be added. A drying step may be performed prior to extrusion or moulding.

The method is particularly useful when the tablet or pellet contains at least one heat-sensitive component, particularly PVC or PVA, most notably PVA. By heat-sensitive is meant that the properties of the component are liable to change if the mixture is melted and subsequently cooled, as happens for example is conventional pellet extrusion processes. It should be noted, however, the advantages (for example in terms of energy saving) may be obtained even when no heat-sensitive components are included.

In a related but independent aspect, the invention provides a method of producing a product of plastics material comprising receiving a supply of cold-pressed tablets or pellets comprising a polymer and at least one compounding ingredient as polymer feedstock and melting and extruding or moulding the polymer feedstock to form the product. The method may include drying the tablets prior to extrusion.

In another aspect, the invention provides a cold pressed pellet or tablet for use as a polymer feedstock, the pellet or tablet comprising a polymer and at least one compounding ingredient, the pellet or tablet containing moisture serving as a binder.

Preferably, all ingredients in the pellet or tablet are food-grade ingredients and/or are bio-degradable. This enables the tablets or pellets to be used to make plastics products having corresponding properties.

Preferably the at least one compounding ingredient includes a lubricant, slip agent or flow improver. The polymer is preferably PVA or PVC. The pellet preferably contains at least one heat-sensitive component.

Preferably the tablet or pellet has a maximum diameter of less than about 1 cm, preferably more than about 2 mm. These dimensions have been found to be convenient for handling on conventional machinery.

Preferably, the pellet or tablet is substantially spherical or ellipsoid. This may facilitate handling.

Tablet-forming machines having a rotating horizontal disc with a plurality of vertical holes in which tablets are formed by upper and lower plates which move sequentially together to compress the tablet and apart to eject a formed tablet as the disc rotates are known. These are suitable for forming moderately large quantities of uniform tablets, typically up to a few thousand a minute for a single disc. However, such machines cannot readily be scaled up, and production of very large quantities of tablets may present problems. The inventor has devised a machine capable of forming higher volumes more readily.

In another aspect, the invention provides apparatus for forming tablets comprising roller means having a plurality of indentations on the rolling surface thereof and backing means, the roller means and backing means defining a nip therebetween; a supply of powder comprising polymer and at least one compounding agent as a feedstock, the powder containing moisture in sufficient quantity to serve as a binder; means for supplying the powder to the roller means at a feed side of said nip; means for advancing the roller means to draw the powder through said nip to compress the powder into said indentations to form compressed tablets; and means for receiving said tablets at the other side of said nip.

This tablet-forming apparatus can be used to form large volumes of tablets, the output volume being adjustable by altering the speed of advancing (rotating) the roller means. The volume of tablets is dependent on the length and effective diameter of the roller, so these dimensions can be scaled to achieve a desired output at a given rotation rate. Continuous rotation allows a high level of production to be maintained.

Preferably the backing means comprises a further roller means; this facilitates feeding of the powder. The further roller means preferably has further indentations and is constrained to rotate in synchronism (i.e. with a substantially equal peripheral speed) with the first roller means, the indentations of each roller being aligned. This facilitates reliable forming of regular shaped tablets, for example bi-convex tablets.

Preferably, recirculating means are provided for receiving powder that has not been successfully formed into tablets and providing it to the feed side. The recirculating means may include filter means for separating tablets from powder. This minimises wastage of powder.

The feed side is preferably above the nip. This enables the powder to be fed under gravity.

Preferably the indentations are substantially hemispherical. This shape has been found to provide reliable compression of the tablets, reliable separation, and a convenient tablet shape.

Preferably the roller means comprises a pair of substantially cylindrical rollers rotating at substantially the same peripheral speed, the two rollers preferably being of substantially equal diameter. This provides a convenient arrangement for feeding the powder.

Preferably means are provided for facilitating separation of the tablets from the roller means, for example including air-knife means or brush means arranged to brush the surface of the roller means. This allows more reliable separation than provided by gravity or due to centrifugal acceleration alone.

The apparatus is preferably arranged to receive polymer and compounding ingredients as mixed powders (preferably substantially dry) and to exert sufficient pressure to the mixed powder to form a self-supporting tablet, preferably requiring no further binder.

The apparatus is preferably arranged to exert a maximum pressure of at least about ¼ tonne, more preferably at least about ½ tonne on each tablet as the powder passes the nip. A pressure exceeding this has been found to be particularly useful for compressing dry polymer powders to form satisfactory tablets without requiring binder. Preferably the maximum pressure is not more than about 20 tonnes, more preferably less than about 5 tonnes; pressures above this limit may cause excessive heat build-up and possibly melting of the polymer.

In a related aspect, the invention provides tablet or pellet forming apparatus comprising first feed means for receiving a polymer in powder form; second feed means for receiving at least one compound ingredient in powder form; mixing means for mixing the polymer and the or each compounding ingredient to form mixed powder containing moisture in sufficient quantity to serve as a binder; pressing means for compressing the mixed powders to form a self-supporting substantially solid tablet or pellet, preferably without the addition of binder. The pressing means is preferably arranged to compress the mixed powders in discrete quantities, but may comprise means for extruding the powders through an orifice.

The invention also provides use of tablet-forming apparatus to provide tablets comprising a polymer and at least one compounding ingredient as a polymer feedstock. The invention further provides use of cold-pressed tablets or pellets comprising a polymer and at least one compounding ingredient in the manufacture of a plastics product.

The invention also provides use of moisture, preferably residual moisture, as a binder in the formation of cold-pressed tablets or pellets of a polymer feedstock comprising polymer and at least one compounding ingredient.

BRIEF DESCRIPTION OF THE DRAWINGS

An embodiment of the invention will now be described, by way of example, with reference to the accompanying schematic drawing in which:

Referring to FIG. 1, which is purely schematic and not a scale, a powdered polymer 10, solid compounding ingredients 12, and optionally liquid compounding ingredients 14 are supplied to a mixer 20. The polymer 10 may be PVA, available from a commercial source. For forming biodegradable products, and for easy forming into tablets, polymer that is 84–98% hydrolysed and has an average molecular weight in the range 25,000–120,000 is preferred. The solid compounding ingredients may include a slip agent, for example containing a stearate, a colouring agent, and a filler, for example containing chalk. The liquid ingredients may include a plasticiser such as glycerol.

Figure 1:
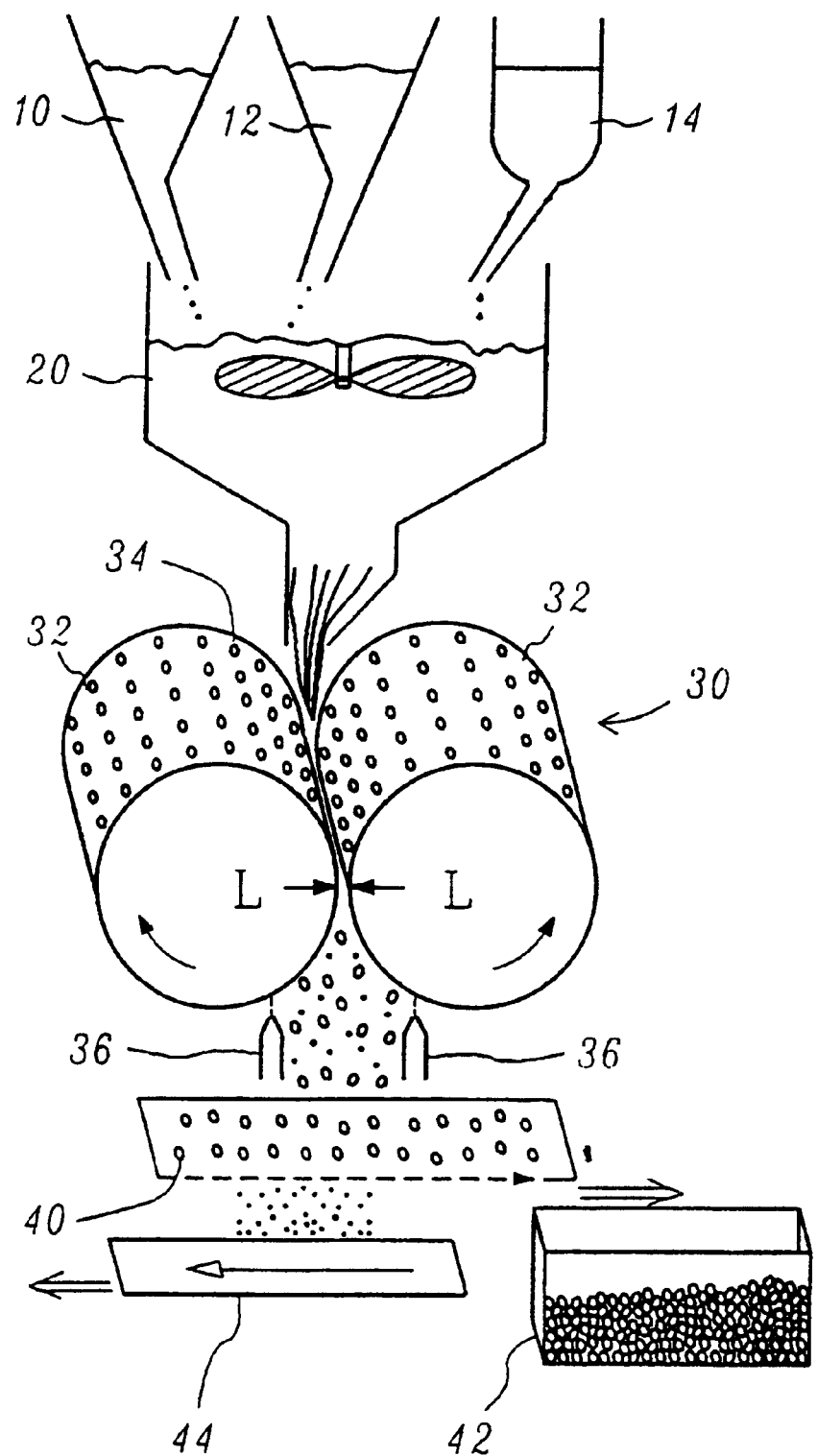
FIG. 1 is a schematic overview of a polymer feedstock production system incorporating the invention.

The mixing speed is controlled to ensure adequate mixing, without allowing the mixture to become too hot. Optionally, air or water cooling may be provided to enable faster mixing to be carried out without overheating. Batch or quasi-continuous flow mixing may be used; batch mixing enables the tablet composition to be changed more readily, whereas flow mixing may enable a more uniform single product to be produced in larger quantities. The powders may be fluidised with air to facilitate mixing, or may simply be stirred with a paddle; known mixing devices may be used.

The mixture is transferred to tabletting apparatus 30. In the tabletting apparatus of this embodiment, the powder is poured and allowed to flow under gravity onto two rollers 32, each having a plurality of indentations 34 on their surfaces, so that it is compressed into tablets as it is advanced through the nip (line of minimum separation) L defied between the rollers. The rollers are driven via gearing (not shown) which keeps them rotating in synchrony so that substantially hemi-spherical indentations on each roller line up to form substantially spherical tablets. The indentations 34 have a diameter of about 5–7 mm. Along the nip line L, the spacing between the rollers is preferably of the order of 1 mm or less; the rollers are substantially touching, although the spacing may be varied, for example depending on the powder consistency. These dimensions are not critical, and, particularly for polymer feedstock it is not necessary for the tablets to be uniform and consistent. Tablets of diameter approximately 6 mm, having a surface area of about 25 cm$^2$ may be successfully pressed when a weight of ¼ to ½ tonne is applied; a pressure of about 100MPa. A pressure in the range 100–1000MPa is preferred.

Below the line of minimum separation L, air-knives 36 comprising a thin jet of compressed air assist gravity and centrifugal acceleration is dislodging the tablets from the rollers. The tablets fall onto a mesh filter conveyor 40 and are transported to a hopper 42, while the powder falls through onto a lower conveyor 44 to be recirculated to the feed side, for example by a further conveyor or by vacuum transport (not shown).

In the embodiment depicted, cylindrical rollers having a diameter of between 30–50 cm and a length of about 2–3 meters rotating at a speed variable between less than 10 rpm up to approximately 1000 rpm, allowing wide variation in the rate of tablet production, up to several million tablets per minute. Cylindrical rollers are not essential; the function of the rollers may be provided, for example, by a flexible belt having the required indentations 34 running over smaller rollers, and this arrangement may define more than one nip line. The roller spacing, curvature, indentation size and density and speed and the powder properties all affect the degree of compression of the powder; these parameters should be adjusted experimentally to ensure reliable tablet-forming for the powder concerned.

The residual moisture should normally be sufficient to ensure adequate binding. In addition, many compounding ingredients, such as lubricants and plasticisers such as glycerol contribute to binding. If poor binding is obtained even at high pressures, the moisture content can be increased by lowering the mixing temperature or by adding extra moisture if necessary for particularly dry powders. If a specific binder is used, it should be chosen so as not to affect the properties of the product adversely, and preferably the binder should be removable by drying the tablets.

It is not essential to use such tabletting apparatus; for smaller volumes, a conventional tablet press for production of pharmaceutical tablets or confectionery may conveniently be used. Likewise, the tablet-forming apparatus of the invention, although particularly advantageous for polymer feedstock forming, may be used for other applications.

The tablets are collected for transport to a product-forming plant (not shown) which would typically be on a separate site. At the product-forming plant, they may be heated to dry them and then melted and extruded through a die, for example to form a film, or moulded into a plastic article; the final process may be any process capable of accepting polymer feedstock in tablet or pellet form, and the pellet size may be adjusted to suit the final process requirements. Additional additives may be included at the final processing stage.

It will be appreciated that aspects of the invention are applicable to a wide variety of materials, and not limited to the polymer feedstocks disclosed. The invention extends to combinations of all features individually disclosed. In particular, optional or preferred features of any of the apparatus, product or method aspects may be combined with features of other aspects. The appended abstract is herein incorporated by reference.

As will be appreciated, the invention may be employed to produce polymer feedstock which is useful is the plastics industry, particularly in the manufacture of bio-degradeable plastics.

What is claimed is:

1. A method of producing a compound polymer feedstock for making a PVA-based polymer product, the feedstock containing polymer in a form suitable for feeding to a machine for manufacturing a product of polymer material, comprising:

mixing PVA polymer with at least one compounding ingredient; and cold pressing the mixture to form tablets or pellets;

wherein a small quantity of moisture is present in the mixture to bind the tablets or pellets.

2. A method according to claim 1, wherein the temperature is maintained below about 100 degrees celsius during mixing and pressing.

3. A method according to claim 1, wherein the moisture content is between about 0.1% and 10% by weight of the pellets.

4. A method according to claim 1, wherein said at least one compounding ingredient includes a lubricant, slip agent or flow improver.

5. A method according to claim 1, wherein the mixture is supplied to pressing means for forming the tablets or pellets as a free-flowing powder.

6. A method according to claim 1, wherein the mixture includes at least one compounding ingredient selected from the group consisting of a stabilizer, a filler, a coloring agent, a plasticiser, a foaming agent, a flame-retardant agent.

7. A method according to claim 1, wherein the polymer and all compounding ingredients are food-grade or bio-degradable.

8. A method according to claim 1, wherein a force of at least about ¼ tonne is used to press each tablet or pellet.

9. A method according to claim 1, wherein the tablet or pellet contains at least one heat-sensitive component.

10. A method according to claim 1, wherein the moisture comprises residual moisture in one or more of the ingredients.

11. A method according to claim 1, further comprising:

melting the tablets or pellets; and extruding or moulding them to form a plastics material product.

12. A method according to claim 11, further comprising adding further compounding ingredients or extrusion or moulding agents to the tablets or pellets.

13. A method according to claim 11, including the step of drying the tablets or pellets prior to extrusion or moulding.

* * * * *

UNITED STATES PATENT AND TRADEMARK OFFICE
CERTIFICATE OF CORRECTION

PATENT NO. : 6,544,452 B1  Page 1 of 1
DATED : April 8, 2003
INVENTOR(S) : Henry Guy Stevens It is certified that error appears in the above-identified patent and that said Letters Patent is hereby corrected as shown below:

<u>Title page,</u>
After item:
"[22] Filed: June 18, 1999" the following should be inserted:

-- Related U.S. Application Data

[63]  Continuation of application No. PCT/GB97/03474 filed on December 18, 1997.

[30]  Foreign Application Priority Data

December 18, 1996  (GB) .............9626209.2 --

Signed and Sealed this

Twenty-third Day of March, 2004

JON W. DUDAS
*Acting Director of the United States Patent and Trademark Office*